Dec. 1, 1959     H. T. RUSSELL     2,915,035
LOW PRESSURE WARNING SIGNAL FOR TUBELESS TIRES
Filed Aug. 14, 1957
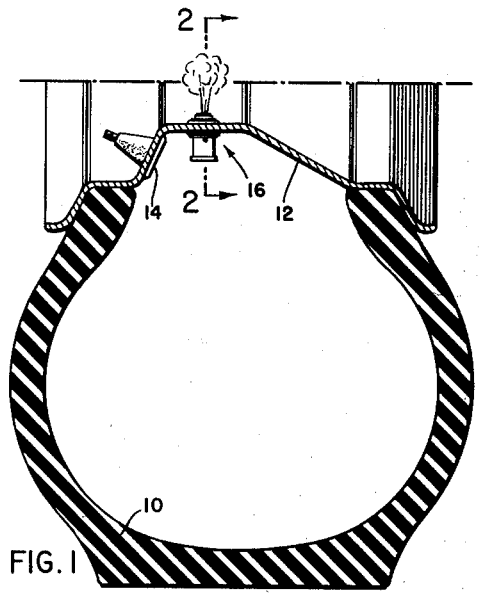
FIG. 1
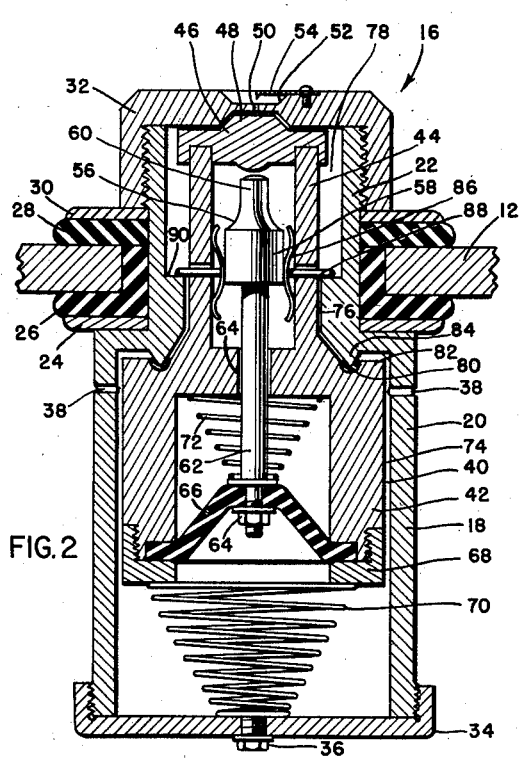
FIG. 2
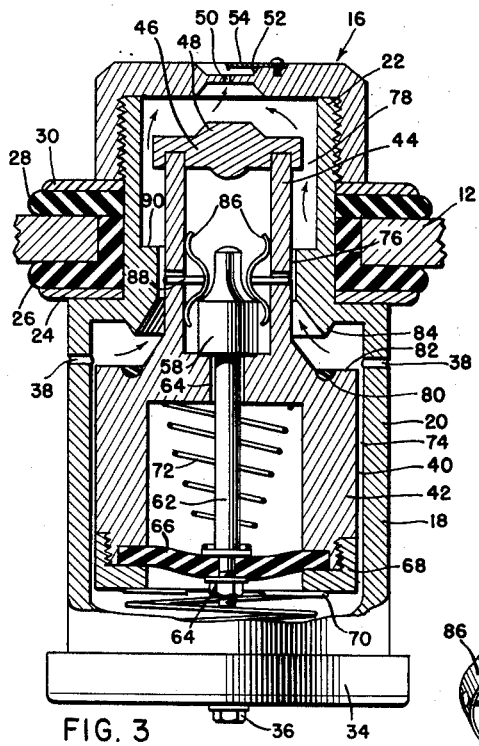
FIG. 3
FIG. 4
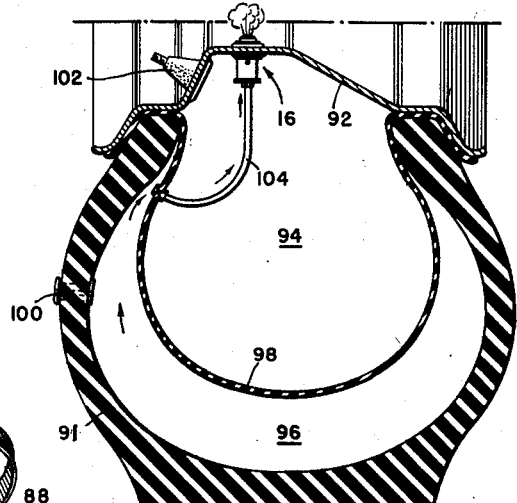
FIG. 5
INVENTOR
Howard T. Russell
BY
ATTORNEY United States Patent Office 2,915,035
Patented Dec. 1, 1959

2,915,035

LOW PRESSURE WARNING SIGNAL FOR TUBELESS TIRES

Howard T. Russell, Havre, Mont.

Application August 14, 1957, Serial No. 678,084

5 Claims. (Cl. 116—34)

The present invention relates to a device for indicating low pressure in an automobile tire. More particularly the present invention relates to a device for automatically emitting an audible signal when the pressure in a tubeless tire falls to a predetermined point.

Low pressure warning devices for automobile tires have been known for some time and have been used principally on conventional type tires which incorporate an inner tube. These prior known warning devices were not found to be practical in use primarily because of the complicated structure involved and the resulting high cost of manufacture. The present invention has particular application for use with the newly developed tubeless tire and consists of relatively few parts and can be produced inexpensively. The present invention is also a wide departure from the conventional warning device and utilizes a new concept for warning devices, whereby centrifugal force, depending on the speed of the vehicle, is adapted to operate a centrifugal piston to cause an audible signal to be actuated when the air pressure in the tubeless tire falls below a predetermined value.

It is therefore an object of the present invention to provide a warning device for tubeless tires which is adapted to emit an audible signal when the pressure in the tire falls below a predetermined value.

Another object of the present invention is to provide a low pressure tire warning device which includes a centrifugally operated member that is actuated at a predetermined speed of the tire to operate the device.

Still another object of the present invention is to provide a low pressure warning device for tubeless tires wherein the warning device is secured directly to the rim of the tire and is therefore easily adaptable to all model tires.

Still another object of the present invention is to provide a low pressure warning device for tubeless tires wherein the interior of the device communicates directly with an interior chamber in the tire and thereby is responsive to the loss of pressure therein.

Still another object of the invention is to provide warning system for tires in which the warning device is not operable at a rest position of the vehicle and is adapted to operate only at a predetermined speed of the vehicle.

Other objects and advantages of the present invention will be apparent from the subsequent description and figures of the drawing wherein:

Fig. 1 is a vertical sectional view of a tubeless tire mounted on a rim, the low pressure warning device embodied herein being secured to the rim and extending interiorly of the tire.

Fig. 2 is a vertical sectional view of the warning device taken along line 2—2 in Fig. 1, showing the location of the component parts thereof when the tire on which the device is mounted is fully inflated.

Fig. 3 is a vertical section view similar to Fig. 2 showing the position of the parts when the pressure within the tire has been reduced and the tire is still rotating at a predetermined speed.

Fig. 4 is a perspective view of the spring that retains the air pressure plunger in position; and Fig. 5 is a vertical sectional view of a modified tire construction utilizing a captive chamber, the warning device being operatively connected to said chamber.

The low pressure warning device for automobile tires embodied in the present invention has particular application with the tubeless type tire although the principle of the invention may also be employed with the conventional style tire that utilizes an inner tube. The present invention incorporates an audible signalling device for indicating the reduction in pressure in the tubeless tire but contrary to the prior known signalling devices the device embodied herein is adapted to operate only above a predetermined speed of the automobile and will not operate below that speed or when the vehicle is at rest, as will be more completely described hereinafter.

Referring now to the drawing and particularly Fig. 1, a tubeless tire 10 is illustrated and is shown in the inflated position, being sealably mounted on a rim 12. A valve stem 14 extends through the rim in the conventional manner and is utilized to inflate the tire 10. Mounted on the rim 12 and located in the deep well thereof is the low pressure warning device embodied in the present invention which is generally indicated at 16. Referring now to Figs. 2, 3 and 4, the low pressure warning device 16 is illustrated in detail and includes a housing 18 that is formed with a lower section 20 and an integral upper reduced section 22. The lower section 20 of the housing extends through an opening formed in the rim 12 and is disposed interiorly of the casing of the tubeless tire 10 while the upper section 22 of the housing extends outwardly of the rim 12 and tire 10. In order to securely seal the warning device to the rim 12, a series of washers are provided and include a bottom metal rim washer 24 that engages the shoulder formed by the reduced upper housing section 22. A rubber cup-like washer 26 is disposed on the bottom metal rim washer 24, the inner diameter of the cup washer being adapted to snugly fit over the reduced upper housing section 22. A rubber rim washer 28 engages the upper edge of the cup portion of the rubber washer 26 and defines a space with the lower portion thereof, the space being adapted to receive the rim 12 in sealing relation. An upper metal rim washer 30 caps the washer assembly and is forced into engagement with the rubber rim washer 28 by a cover cap 32. The cover cap 32 is internally threaded and is received by a threaded portion formed on the upper portion of the reduced upper housing section 22. It is seen that as the cover cap 32 is tightened on the reduced upper housing section 22, the washer assembly will be forced into tight engagement with the rim 12 to sealingly secure the warning device 16 over the rim 12.

The hollow housing 18 is closed at the lower end thereof by a bottom cap 34 that threadably engages a threaded portion formed on the lowermost end of the lower housing section 20. A threaded plug 36 is located in the bottom cap 34 and is removable in a modified form of the invention to provide access to the housing interior as will be described hereinafter. Formed in the wall of the lower housing section 20 are a plurality of air inlet ports 38 that provide communication between the interior of the tire casing and the interior of the housing 18.

Disposed within the housing 18 is a centrifugal piston 40 that includes a tubular lower portion 42 and an integral reduced tubular upper portion 44. Fixed to the upper end of the reduced upper portion 44 is a snap-on cap 46 that is formed with a raised portion 48. The raised portion 48 fits into a complementary groove formed on the underside of the cover cap 32 and is disposed directly under an air vent 50. The air vent 50 communicates with a depression 52 formed on the upper side of the cover cap 32 over which a thin reed 54 is positioned. It is seen that air escaping from the air vent 50 will strike the reed 54 and an audible whistling sound will result. Although one form of an audible signalling element is shown it is understood that any convenient form of air pressure responsive whistling device may be employed without departing from the spirit of the invention.

Disposed within the chamber formed in the upper tubular portion 44 is a plunger 56 that is formed with a head 58 that tapers to a reduced end portion 60. Formed integrally with the plunger head 58 and extending downwardly therefrom is a stem 62. The stem 62 extends through an opening 64 formed in the upper wall of the piston lower portion 42 and extends further into the chamber formed in lower tubular portion 42 of the centrifugal piston 40. Fixed to the lower end of the plunger stem 62 by a nut 64 is a resilient diaphragm 66 preferably formed of rubber. In order to securely retain the diaphragm 66 in position, the peripheral edge thereof is disposed in a recess formed in the lowermost edge of the lower tubular portion 42; and a retaining member 68 that threadably engages the lower portion abuts against the outer edge of the diaphragm. The retaining member 68 has a central opening formed therein that provides for communication of the outer surface of the diaphragm 66 with the interior of the housing 18. A spring 70 is disposed between the inner surface of the bottom cap 34 and the retaining member 68 and is calibrated to normally bias the centrifugal piston 40 to the position shown in Fig. 2. A second spring 72 surrounds the plunger stem 62 and is disposed between the diaphragm 66 and the upper wall of the chamber formed in the lower piston portion 42 and tends to bias the diaphragm to a planular position. However, under normal operating conditions the diaphragm 66 will be flexed under pressure of the compressed air in the tire 10 and the spring 72 will be compressed as shown in Fig. 2.

The centrifugal piston 40 is sufficiently spaced from the inner surface of the wall of the housing 18 to provide an annular passage 74 through which compressed air from the tire interior can pass into the lower section 42 of the piston and into contact with the diaphragm 66. Under normal operating conditions the pressure exerted by the compressed air in the tire will flex the diaphragm 66 to the position shown in Fig. 2.

The air inlet 38 is also adapted to communicate with the air vent 50 through an annular passage 76, the annular passage 76 communicating with a space 78 surrounding the upper portion 44 of the centrifugal piston 40. However, since communication between the air inlets 38 and the air vent 50 is only desired when the pressure in the tire 10 is reduced the air inlets 38 are normally sealed from the air vent 50. The sealing means includes an annular sealing member 80 that is positioned in a shoulder 82 formed on the lower piston portion 42 and an annular projection 84 that is formed on upper wall of the lower housing section 20. It is seen that as the centrifugal piston 40 is forced upwardly by the spring 70, the sealing member 80 is forced into engagement with the annular projection 84 to form a tight seal and close off communication between the passages 74 and 76. Air from the tire 10 is then forced to enter the lower section 20 of the housing 18 and into contact with the diaphragm 66.

In order to retain the piston 40 in the upper or sealed position as shown in Fig. 2, a locking means is provided and includes a pair of locking springs 86 which have a modified W configuration as shown in Fig. 4. The locking springs 86 are disposed in the upper chamber of the piston 40 and in the normal operating position bear against the plunger head 58 and the wall of the tubular upper portion 44 of the piston. In this position the springs 86 are compressed and lock pins 88 which are secured thereto and which extend through convenient openings in the piston upper portion wall are forced onto shoulders 90 formed on the inner wall of the housing upper section 22 thereby locking the centrifugal piston 40 in the sealed position. It is seen that when the lock springs 86 are moved out of engagement with the plunger head 58 and into the position shown in Fig. 3, the lock springs will return to their normal position thereby withdrawing the lock pins 88 from engagement with the shoulder 90. The centrifugal piston 40 is then released for movement and responds to centrifugal force to move downwardly thereby breaking the seal between the passages 74 and 76. Air from the tire interior passes through passages 76 and 78 and out of the air vent 50 to strike the reed 54, whereby an audible signal is produced to indicate the presence of low pressure in the tire.

In operation, the centrifugal piston 40 is normally retained in the upper or sealing position by the spring 70 as shown in Fig. 2. Normally the spring 72 would retain the diaphragm 66 in a planular position, but since the lower surface of the diaphragm is responsive to air under pressure in the tire 10 directed thereto through air inlets 38, it is flexed to the position shown in Fig. 2. In this position the plunger head 58 engages the lock springs 86 which are forced toward a flat position thereby forcing the lock pins 88 to engage the annular shoulder 90. In this position the passages 74 and 76 are sealed from communication by the engagement of the projection 84 with the sealing member 80. When a leak develops in the casing or valve of the tire 10, the pressure therein begins to decrease. When the pressure falls below a predetermined value determined by the calibration of the spring 72, the diaphragm 66 will be forced downwardly by the spring 72, thereby pulling the plunger 56 therewith. When the plunger is moved downwardly a sufficient amount to move the lock springs 86 out of engagement with the plunger head 58 and onto the reduced portion 60 of the plunger 56, the lock springs 86 return to their normal position as shown in Fig. 3, thereby withdrawing the lock pin from engagement with the annular shoulder 90. The centrifugal piston is then free for vertical movement and will move outwardly away from the vehicle axle under the action of centrifugal force and against the action of the spring 70. The seal between projection 84 and sealing member 80 is thus broken and air under pressure within the tire escapes through passages 76 and 78 and out of the device by way of the air vent 50. As the air escapes through the vent 50, the reed 54 is actuated to produce an audible whistling sound that will be a signal to the operator of the vehicle that the pressure in the tire is below normal.

It has been found that it is not necessary to warn the vehicle operator of the low pressure in the tire at low speeds or when the vehicle is at rest since the danger period occurs at high speeds of the vehicle. Consequently the spring 70 is calibrated to automatically reset the centrifugal plunger 40 when the vehicle is reduced to a predetermined speed, for example, approximately 20 m.p.h. At this speed the spring 70 forces the centrifugal piston upwardly until the sealing member 80 once again engages the annular projection 84. Since the pressure in the tire is still reduced below normal the diaphragm 66 will remain in position shown in Fig. 3 thereby causing the centrifugal piston 40 to, in effect, float. If the speed of the vehicle is again increased the centrifugal piston 40 will move outwardly to cause the escaping air to produce the audible signal.

Referring now to Fig. 5, a modified form of the invention is illustrated and has particular application with the captive air chamber type of tubeless tire. In Fig. 5 the tire casing is indicated at 90 and has a rim 92 secured thereto. An inner chamber 94 and outer chamber 96 are defined by a flexible member 98 that is secured between the rim 92 and casing 91. The inner chamber 94 defines the captive air chamber and will remain at a constant pressure even though the pressure in the outer chamber may decrease due to a leak in the wall of the casing 91. The outer chamber 96 is inflated through a basket-ball type valve 100 while the inner chamber is inflated through a conventional type of tubeless tire valve 102.

The signalling device 16 is mounted in the rim 92 as described above, but in order to detect a loss of pressure in the outer chamber 96, the plug 36 is removed and replaced by a suitable coupling to which is attached a hose 104. The hose 104 is sealingly secured in the flexible member 98 and communicates with the interior of the outer chamber 96. The hose 104 thus replaces the air inlets 38 of the above described form of the invention but in operation the signalling device 16 is identical as set forth above.

It is seen that if the pressure in the outer chamber 96 falls below predetermined value, the reduced pressure in the chamber 96 will be communicated to the diaphragm 66 through the hose 104, and the signalling device will be caused to emit an audible signal as described above.

It will be obvious to those skilled in the art that various changes may be made without departing from the spirit of the invention and therefore the invention is not limited to what is shown in the drawings and described in the specification but only as indicated in the appended claims.

I claim:

1. In a low pressure warning device for automobile tires, a housing, means in said housing forming an air inlet, and means in said housing forming an air vent, said air inlet connecting the interior of said housing with the interior of said tire, and said air vent connecting the interior of said housing with the exterior of said housing and tire, signalling means arranged on said housing adjacent said air vent and positioned in the path of air passing through said vent whereby said signalling means is responsive to air passing through said vent to emit an audible signal, means disposed within said housing between said air inlet and air vent sealing communication therebetween, and means responsive to centrifugal force and reduced tire pressure positioned within said housing and connected to said sealing means, said centrifugally responsive means being movable in a direction away from said vent under the action of centrifugal force and in response to reduced air pressure in said tire to move said sealing means to an unsealed position, and thereby provide a passage for air between the interior of said tire and said air responsive signalling means.

2. The warning device of claim 1 wherein the means responsive to centrifugal force and reduced tire pressure includes a piston having a portion normally disposed in sealing engagement with a portion of said housing located between said air inlet and air vent thereby preventing communication therebetween and constituting said sealing means, said piston being movable away from said housing portion under the action of centrifugal force generated by tire movement, a diaphragm mounted on said piston and responsive to air under pressure in said tire to force said piston and piston portion into sealing engagement, a plunger secured to said diaphragm, locking means on said piston engaging said plunger when said piston is in sealing engagement and during said engagement also engaging said housing to retain said piston in sealing engagement, said locking means being movable out of housing engagement when disengaged from said plunger, said diaphragm and plunger being movable in a direction away from said air vent when the pressure in said tire is decreased to a predetermined value, whereby said locking means disengages from said plunger and housing and said piston moves under the action of said centrifugal force to establish communication between said air inlet and air vent.

3. The warning device of claim 2 wherein a pair of calibrated springs are provided, one of said springs being positioned in engagement with said diaphragm and opposing the movement thereof in response to reduced air pressure; and the second of said springs is positioned in engagement with said piston and opposing the movement thereof in response to centrifugal force whereby said signalling means will be actuated only in response to a predetermined reduction in air pressure and a predetermined tire speed.

4. The warning device of claim 1 wherein said tire has means forming an inner chamber and an outer chamber therein, and conduit means connect said outer air chamber and said air inlet.

5. The warning device of claim 2 wherein the locking means includes a pair of leaf springs carrying a pair of locking pins, said leaf springs being positioned to engage said plunger and said pins being positioned to engage said housing.

No references cited.